May 24, 1932.                F. W. ROLLER                 1,860,054
                              WALL SWITCH
                    Filed March 10, 1928      2 Sheets-Sheet 1
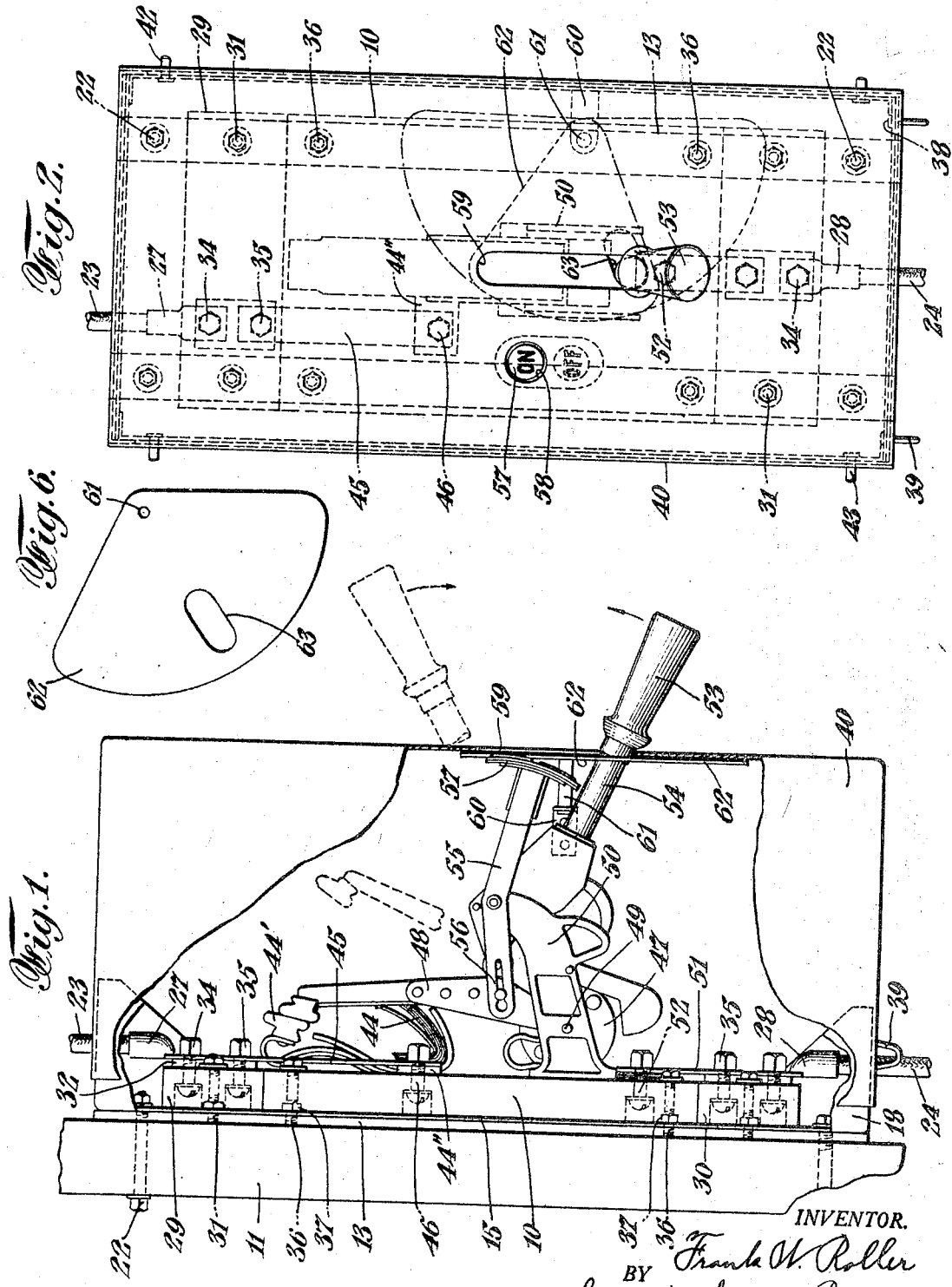

May 24, 1932.  F. W. ROLLER  1,860,054
WALL SWITCH
Filed March 10, 1928   2 Sheets-Sheet 2
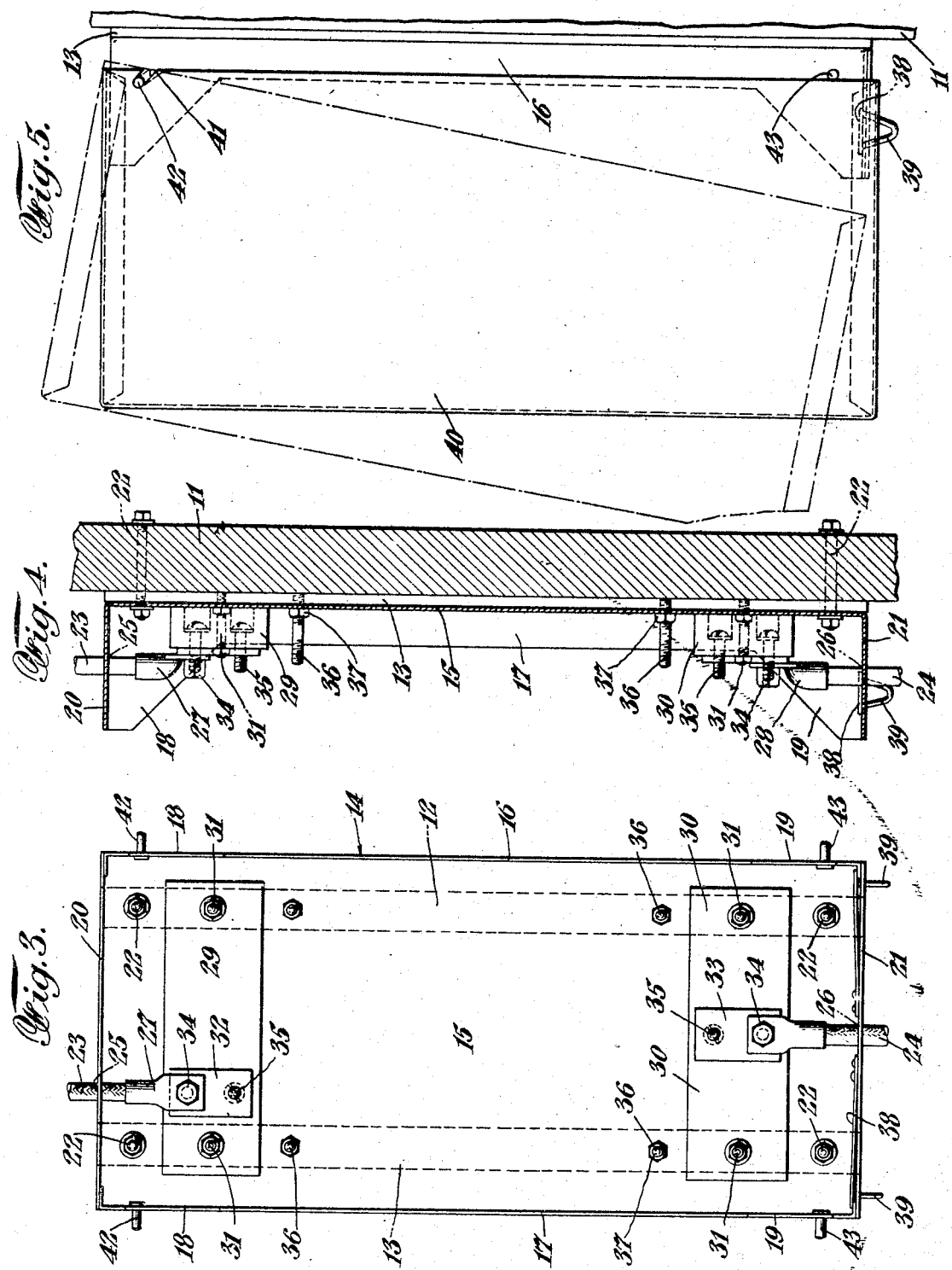

Patented May 24, 1932

1,860,054

UNITED STATES PATENT OFFICE

FRANK W. ROLLER, OF EAST ORANGE, NEW JERSEY, ASSIGNOR TO ROLLER-SMITH COMPANY, A CORPORATION OF NEW YORK

WALL SWITCH

Application filed March 10, 1928. Serial No. 260,743.

This invention relates to improved means for installing and enclosing circuit breakers, switches and the like, and is particularly applicable to the installation and protection of such devices of the wall type.

One object of this invention is to facilitate the installation of such electric controlling apparatus on the walls of buildings by use of a relatively shallow base element which may be installed in position during the construction of the building and while the rough wiring is being done, and which permits the switch mechanism or circuit breaker to be conveniently and quickly installed and connected after completion and finish of the building. The switch mechanism or breaker is thus safeguarded from dust and dirt and possible injury likely to occur during construction work. Another object is to permit the convenient and ready removal of the switch mechanism as a unit and its replacement without disturbing, or materially disturbing, the wiring connections. Another object is to provide enclosing means for the switch mechanism or breaker in such manner and in such relation thereto that the same may be conveniently removed and replaced and when removed substantially exposes the entire switch mechanism down to its supporting base. This permits easy examination and adjustments of all parts of the mechanism, avoiding the usual difficulty of an enclosing box with a removable front cover where the parts of the breaker are deeply seated in inaccessible locations. Another object is to provide an enclosing means which will permit the outside operating handle to be freely moved in a slot in the casing to open and close the switch mechanism and yet reduce the entrance of dust and dirt to a minimum by providing an improved protecting shield.

Further objects and advantages will be apparent from the following specification and drawings, in which Fig. 1 is a side elevation of the circuit breaker with a portion of the cover broken away.

Fig. 2 is a front elevation of the circuit breaker.

Fig. 3 is a front elevation of the base mounting for the breaker.

Fig. 4 is a sectional view of Fig. 3.

Fig. 5 is a side elevation of the casing mounting for the circuit breaker, and

Fig. 6 is a plan view of the pivoted shutter.

The entire circuit breaker mechanism is mounted on an insulating base plate 10 which is detachably secured to a base mounting attached to a wall or other support 11.

The base mounting comprises a shallow sheet metal base element 14 and is spaced from the wall by two spacing strips 12 and 13. The metal base element is provided with a bottom section 15 and low side portions 16 and 17 extending outwardly from the bottom section at right angles thereto and with enlarged portions 18 and 19 adjacent each end. The end portions 20 and 21 also extend outwardly at right angles to the base and are welded, or otherwise secured, to the enlarged portions 18 and 19 forming a relatively shallow boxlike structure. This base element 14 is secured to the wall 11 by means of bolts or screws 22 passing through the bottom section 15, spacing strips 12 and 13 and the wall 11 as clearly shown in Figs. 3 and 4. The lead wires 23 and 24 pass through apertures or cut-outs 25 and 26 in the end portions 20 and 21 and are provided with connecting lugs or terminals 27 and 28.

The insulating base plate 10 of the circuit breaker mechanism fits between two transversely extending insulating terminal blocks 29 and 30 of substantially the same thickness as the base plate 10 and are secured to the bottom 15 of the base element 14 by stud bolts 31 threaded into the bottom 15 and spacing strips 12 and 13. These terminal blocks 29 and 30 support the terminal plates 32 and 33 which are secured thereto by bolts 34 and 35. The bolts 34 also serve to clamp the terminal lugs 27 and 28 to the terminal plates; and the bolts 35 serve to clamp the metal connecting links 45 and 51 to the terminal plates, these links in turn making connection to the circuit breaker. Also threaded into the bottom 15 and strips 12 and 13 are the stud bolts 36, secured in position by nuts 37 for securing the base plate 10 in position. The lower end portion 21 has secured thereto on its inner face the leaf springs 38 carrying hasps 39 which project outwardly through openings in the portion 21 and are adapted to engage openings in and to hold in place the relatively deep boxlike cover 40.

The boxlike cover 40 is relatively deep as compared to the relatively shallow base element 14 as shown in Figs. 1 and 5 and is provided with slots 41 at its upper inner corners for engaging and for removably pivoting on pins 42 secured to the enlarged portions 18 of the base element. The lower enlarged portions 19 of the base element are provided with stop pins 43 for limiting the innermost position of the cover 40 in its closed position, the hasps 39 passing through apertures in the lower portion of the cover.

The circuit breaker mechanism is mounted upon the base plate 10 as shown in Figs. 1 and 2. The upper main stationary contact 44 and supplemental carbon contact 44' are secured on the upper central portion of the base plate. From the main stationary contact a metal sidewise piece 44" extends to the left and is secured to the insulating base 10 by the bolt 46, which also serves to clamp the lower end of link 45 to, and make electrical connection with, the stationary contact. The movable switch element 48 of the breaker is pivoted at 49 between side supporting frames 50 and is adapted to engage with the main contact 44 and with the carbon contact 44'. The trip coil 47 of the breaker has one end connected to the movable switch element and the other end is clamped to the base 10 by the bolt 52, which also serves to clamp the upper end of link 51 thereto and make electrical connection therewith.

The handle 53 is pivotally mounted between the side frames 50 and is adapted to close the breaker by downward movement of the handle. The mechanism for closing the breaker and securing automatic opening thereof with release from the handle during such movement, is unnecessary to describe herein, as it forms no part of the present invention. In fact, as far as the present invention is concerned, the breaker or switch mechanism may be of any preferred form of construction, and the particular type indicated is only for the purpose of general illustration.

In the form considered, the switch handle does not necessarily indicate by its position whether the breaker is closed or open. For the purpose of giving a visual indication of its condition a lever 55 is pivoted on the side frame 50 and has a pin and slot connection 56 at its inner end with the movable switch element 48 and carries at its outer end a target or indicating device 57 which can be seen through and is immediately beneath an aperture 58 in the casing 40. This will show by its position and the legends thereon whether the breaker is on or off.

The handle 53 extends through a vertical slot 59 in the casing 40 to permit manual closing and opening of the breaker. In order to reduce to a minimum the entry of dust and dirt within the breaker, a movable shield or shutter 62 is mounted within the casing so as to cover the slot 59 in all positions of the breaker handle. The shield is of the shape shown in Fig. 6 and has a small slot 63 therein to permit the shank of the breaker handle to pass through the same. The right-hand end of the shield is pivotally mounted on a pin 61 which in turn is supported on a bracket 60 affixed to the side of the casing 40, as shown in Fig. 1. It is evident that when the handle is moved in the slot 59, the shield will cover the slot in any position of the breaker, the dotted line in Fig. 2 indicating the position of the shield when the breaker handle is down and the dot and dash line indicating the position of the shield when the handle is up. In order to reduce friction, the shank of the handle is provided with a rotatable metal sleeve 54 which may turn as desired during the upward or downward movement of the handle due to its contact with the upper or lower edge of the slot 63.

During construction of the building in which the present invention is to be utilized, the wiring will be installed and the base elements 14 mounted in the various locations where the circuit breakers are to be installed. In the preferred form of this invention, as disclosed herein, the connections of the wiring are completed to the terminal blocks 29 and 30 during construction of the building. After the construction work on the building has been completed, the insulating base plate 10, with the circuit breaker or switch mechanism mounted thereon, is secured to the base element as already described by the stud bolts 36, the connections between the breaker and the wiring being completed by the connecting links 45 and 51.

The cover 40 is then placed in position by first causing the slots 41 to engage the pins 42, as indicated in the dotted line position of Fig. 5, the cover then being swung so that the hasps 39 snap through openings in the lower portion of the cover to hold the same in position. If desired, the cover may be sealed or locked in its closed position by a padlock engaging one or both of the hasps or by using the usual seal. After the cover is in place, the handle is passed through the openings 63 of the shield 62 and the shank of the handle screwed into, or otherwise secured, to the element of the breaker controlled by the handle.

This invention is applicable to the use of any type of circuit breaker with any desired form of automatic control and to any form of switch mechanism where the same is mounted as a self-contained unit on an insulating base. It will also be understood that in some cases terminal blocks on the base element with terminal connections may not be utilized, the building wiring being left unconnected until the switch mechanism is installed in position, and the wiring leads or terminals may then be connected directly to the terminals of the switch mechanism. Furthermore, although in the form described the wiring leads are shown as entering upper and lower portions of the base element, in some cases it may be desirable to have both wiring leads enter through the upper end portion or through the lower end portion, or through one or more side portion extensions. Various other modifications may be made without departing from the scope of this invention.

I claim:

1. A switch comprising a shallow box element adapted to be mounted on a wall, said element having end terminal blocks to receive connecting lead wires, a removable base plate mounted within and upon the bottom of said element and located between said terminal blocks, a switch mechanism carried by said base plate adapted to be attached and removed as a unit with said base plate to and from said element, and means comprising terminals on the face of said base plate for connecting the terminals of said terminal blocks to said switch mechanism.

2. A switch comprising a shallow box element adapted to be attached to the support, said element having spaced terminal blocks attached thereto adapted to receive connecting lead wires, a removable base plate element mounted within and upon the bottom of said element and located between said terminal blocks, a switch mechanism carried by said base plate adapted to be attached and removed as a unit with said base plate, to and from said element, terminals on the face of said base plate for connecting said switch mechanism to said lead wires, and a cover for said switch mechanism removably attached to said element and which upon removal exposes said switch mechanism on all sides.

3. A switch comprising a shallow box element containing terminals of connecting lead wires, a removable base plate mounted within and upon the bottom of said element, a front operated switch mechanism mounted on said base plate, said base plate and switch mechanism being adapted to be attached and removed as a unit to and from said element, terminals on the face of said base plate for connecting said switch mechanism to said lead wires, and a deep cover removably attached to said element which upon removal permits access to said switch mechanism on all sides.

4. A switch comprising a shallow box element, a base plate removably mounted within and upon the bottom of said element, a switch mechanism having a front operated handle mounted on said plate, terminals on the face of said base plate for connecting said switch mechanism to the external circuit, a deep cover removably attached to said element having a slot for said handle and which cover when removed permits access to said switch mechanism on all sides, and a shield pivoted on said cover and operated by movement of said handle for covering said slot irrespective of the position of said handle.

5. A switch comprising a shallow box element, a base plate removably mounted within and upon the bottom of said element, a switch mechanism mounted on said base plate having a front operated handle and having an inner portion mounted to rotate about the axis of the handle as a center, a deep cover removably attached to said element and having a slot for said handle, and a shield pivoted on said cover adapted to cover said slot in said cover and having a slot to receive the inner portion of said handle, said shield being operated by movement of said handle, the said handle having a rotatable inner portion which rolls in said slot of said shield to decrease friction therebetween.

6. A switch comprising a shallow box element adapted to be mounted on a wall, said element being adapted to receive connecting lead wires, a removable base plate mounted within and upon the bottom of said element, a switch mechanism having a front operated handle, an inner portion of said handle being rotatable on its axis, said switch mechanism being carried by said base plate and adapted to be attached to and removed from said element as a unit with said base plate, a deep cover removably attached to said element having a slot for said handle, and a shield pivoted on said cover adapted to cover said slot in said cover irrespective of the position of said handle, said shield having a slot for receiving said inner rotatable portion of said handle, and said shield being operated by said handle.

7. A switch comprising a base element, a base plate, a switch mechanism having a front operated handle mounted on said plate, a cover removably attached to said base element having a slot for said handle, and a shield pivotally mounted on said cover and operated by said handle to cover said slot irrespective of the position of said handle.

FRANK W. ROLLER.